United States Patent Office 2,993,897
Patented July 25, 1961

2,993,897
s-TRIAZINYLMETHYL UREAS
Seymour L. Shapiro, Hastings on Hudson, and Louis Freedman, Bronxville, N.Y., assignors to U.S. Vitamin & Pharmaceutical Corporation, a corporation of Delaware
No Drawing. Filed Apr. 15, 1960, Ser. No. 22,414
6 Claims. (Cl. 260—249.9)

This invention is concerned with novel triazine derivatives, and particularly s-triazinylmethyl ureas, of the structure:

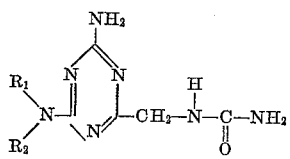

The compounds can be alternatively named as 2-amino-4-substituted amino-6-ureidomethyl-s-triazines.

In this invention, $R_1$ is selected from the group consisting of alkyl, aralkyl, phenyl, halo, methoxy or alkyl substituted phenyl, $R_2$ is selected from the group consisting of hydrogen and lower alkyl, and includes those radicals wherein $R_1R_2N-$ is a cyclic amino group such as piperidino, morpholino, pyrrolidino.

The novel s-triazinylmethyl ureas are markedly distinct from other ureido triazine derivatives previously reported (E. M. Smolin and L. Rapoport, s-Triazines and Derivatives, Interscience Publishers, New York, N.Y., 1959, p. 56, 236) which have the ureido group or groups attached directly to the triazine nucleus.

The compounds are prepared by reaction of ethyl hydantoate with a substantially equivalent quantity of the biguanide in a solvent such as methanol, and after a suitable reaction period desirably at about 20° and over 48–96 hrs. the reaction mixture is quenched by decantation into water and the formed product is separated and purified by recrystallization.

The compounds of this invention show useful pharmacological properties, particularly as anti-convulsant agents, analgesics and anti-inflammatory agents. The compounds are weak bases and accordingly, salts with strong mineral acids such as hydrochloric, hydrobromic, and the like may be formed.

The process and compounds of this invention will be more clearly understood from a consideration of the following specific examples which are given for the purpose of illustration only and are not to be construed as limiting the scope of the invention in any way.

EXAMPLE 1

2 - amino - 4 - anilino - 6 - (ureidomethyl) - s - triazine.—A solution of 7.3 g. (0.05 mole) of ethyl hydantoate in 50 ml. of methanol was treated with 8.9 g. (0.05 mole) of phenylbiguanide and the reaction stored at 20° for 4 days. The reaction mixture was added to 50 ml. of water and the product (1.65 g.) was separated. recrystallization (dimethylformamide-ether) yielded 1.44 g. (11%) of product which melted at 227° dec.

EXAMPLE 2

In a similar manner and using the appropriate biguanide, the triazinylmethyl ureas prepared have been tabulated.

Table

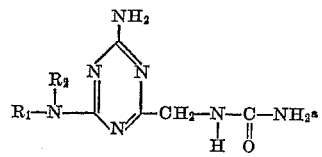

| No. | $R_1$ | M.P., °C.[b] | S[c] | Formula | Carbon Calcd. | Carbon Fd. | Hydrogen Calcd. | Hydrogen Fd. | Nitrogen Calcd. | Nitrogen Fd. |
|---|---|---|---|---|---|---|---|---|---|---|
| 1 | $C_3H_5$—[e] | 202–303 d. | A | $C_8H_{13}N_7O$ | 43.0 | 43.1 | 5.1 | 5.8 | 43.9 | 44.4 |
| 2 | (g) | 231 d. | A | $C_{10}H_{17}N_7O$ | 47.8 | 48.1 | 6.8 | 7.1 | | |
| 3[a 1] | $C_6H_5CH_2$— | 183–184 | B | $C_{13}H_{19}N_7O_2$[f] | 51.1 | 52.1 | 6.3 | 6.3 | | |
| 4 | $C_6H_5CH_2CH_2$— | 204–205 d. | A | $C_{13}H_{17}N_7O$ | | | | | 34.1 | 33.8 |
| 5 | $C_6H_5$— | 227 d. | C | $C_{11}H_{13}N_7O$ | 51.0 | 51.4 | 5.1 | 5.0 | 37.8 | 37.6 |
| 6[a 1] | $C_6H_5$— | 238 d. | B | $C_{12}H_{15}N_7O$ | 52.7 | 53.2 | 5.5 | 5.9 | 35.9 | 36.3 |
| 7 | 2—$CH_3C_6H_4$— | 209–211 d. | B | $C_{12}H_{15}N_7O$ | 52.7 | 52.2 | 5.5 | 5.4 | 35.9 | 35.5 |
| 8[a 1] | 2—$CH_3C_6H_4$— | 247–248 d. | B | $C_{13}H_{17}N_7O$ | 54.3 | 54.3 | 6.0 | 6.0 | 34.1 | 34.4 |
| 9[a 2] | 4—$CH_3C_6H_4$— | 213–214 d. | B | $C_{14}H_{19}N_7O$ | 55.8 | 55.4 | 6.4 | 6.1 | | |
| 10 | 2,6-di$CH_3C_6H_3$— | 250 d. | A | $C_{13}H_{17}N_7O$ | 54.3 | 53.7 | 6.0 | 5.9 | 34.1 | 34.2 |
| 11 | 2—$ClC_6H_4$— | 169 | D | $C_{11}H_{12}ClN_7O$ | | | | | 33.4 | 33.1 |
| 12 | 4—$ClC_6H_4$— | 257 d. | A | $C_{11}H_{12}ClN_7O$ | 45.0 | 44.9 | 4.1 | 3.7 | 33.4 | 33.5 |
| 13 | 2—$BrC_6H_4$— | 295 d. | A | $C_{11}H_{12}BrN_7O$ | 39.1 | 39.9 | 3.6 | 3.6 | 29.0 | 28.5 |
| 14 | 3—$BrC_6H_4$— | 218 d. | A | $C_{11}H_{12}BrN_7O$ | 39.1 | 39.5 | 3.6 | 3.8 | 29.0 | 28.6 |
| 15 | 4—$CH_3OC_6H_4$— | 216–217 | B | $C_{12}H_{15}N_7O_2$ | 49.8 | 50.1 | 5.2 | 5.0 | | |

[a] $R_2$=H unless otherwise indicated.
[a 1] $R_2$=$CH_3$—.
[a 2] $R_2$=$C_2H_5$—.
[b] Melting points are not corrected.
[c] Recrystallizing solvent: A=dimethylformamide+acetonitrile; B=dimethylformamide; C=dimethylformamide+ether; D=acetonitrile.
[d] Analyses by Weiler and Strauss, Oxford, Engalnd.
[e] $C_3H_5$— is allyl.
[f] Isolated as a hydrate.
[g] $R_1R_2N$—is piperidino.

For therapeutic purposes the compounds of this invention are formulated to contain 20–200 mg. of active ingredient in a pharmaceutical extender which does not co-act with the active principles described herein.

It is to be understood that it is intended to cover all changes and modifications of the examples herein chosen for the purposes of illustration which do not constitute departures from the spirit and scope of the invention.

We claim:
1. The compound

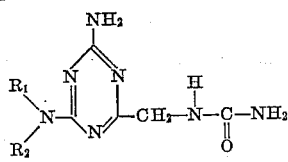

wherein (a) $R_1$ is selected from the group consisting of lower alkyl, lower aralkyl, phenyl, and substituted phenyl wherein said substituents are selected from the group consisting of lower alkyl, lower alkoxy, chloro and bromo, $R_2$ is selected from the group consisting of hydrogen and lower alkyl, and wherein (b) $R_1+R_2$ is pentamethylene.

2. The compound of claim 1, wherein $R_1$ is phenyl and $R_2$ is hydrogen.
3. The compound of claim 1, wherein $R_1$ is o-chlorophenyl and $R_2$ is hydrogen.
4. The compound of claim 1, wherein $R_1$ is benzyl and $R_2$ is methyl.
5. The compound of claim 1, wherein $R_1$ is o-bromophenyl and $R_2$ is hydrogen.
6. The compound of claim 1, wherein $R_1$ is phenyl and $R_2$ is methyl.

References Cited in the file of this patent

UNITED STATES PATENTS 2,394,042    D'Alelio _____ Feb. 5, 1946